United States Patent [19]
Sato et al.

[11] 4,257,227
[45] Mar. 24, 1981

[54] SECONDARY AIR CONTROLLING APPARATUS FOR INTERNAL COMBUSTION ENGINES

[75] Inventors: Toshihiko Sato; Yoichi Ishida, both of Saitama; Kanau Iwashita, Sakado, all of Japan

[73] Assignee: Honda Giken Kogyo Kabushiki Kaisha, Tokyo, Japan

[21] Appl. No.: 972,733

[22] Filed: Dec. 26, 1978

[30] Foreign Application Priority Data

Dec. 26, 1977 [JP] Japan ................................. 52-157116
Dec. 26, 1977 [JP] Japan .......................... 52-175478[U]

[51] Int. Cl.³ ............................................ F02M 23/04
[52] U.S. Cl. ........................................ 60/290; 60/293; 123/587
[58] Field of Search ................................ 60/293, 290; 123/DIG. 11, 124 R, 124 B, 119 D, 119 DB, 97 B

[56] References Cited

U.S. PATENT DOCUMENTS

| | | | |
|---|---|---|---|
| 3,364,909 | 1/1968 | Mick | 123/124 R |
| 3,751,915 | 8/1973 | Ranft | 60/293 |
| 3,751,916 | 8/1973 | Hayashida | 123/97 B |
| 3,841,282 | 10/1974 | Rogerson | 123/DIG. 11 |
| 3,948,236 | 4/1976 | Nartowski | 123/124 R |
| 3,996,739 | 12/1976 | Ono | 60/290 |

FOREIGN PATENT DOCUMENTS

| | | | |
|---|---|---|---|
| 2114922 | 10/1971 | Fed. Rep. of Germany | 60/290 |
| 1383327 | 2/1975 | United Kingdom | 123/DIG. 11 |

Primary Examiner—Robert E. Garrett
Attorney, Agent, or Firm—Irving M. Weiner; Pamela S. Burt; John L. Shortley

[57] ABSTRACT

In an exhaust gas cleaning system wherein secondary air is supplied into the exhaust passage to re-burn the unburnt harmful component in the exhaust gases, a secondary air controlling apparatus for an internal combustion engine is provided. At deceleration of the vehicle, secondary air is interrupted from being fed into the exhaust passage, and is introduced into the intake passage to prevent after-burning in the exhaust cleaning system. When the ignition key is switched off, secondary air is fed into the intake passage to prevent the unburnt gas from flowing out into the exhaust passage. This effect is attained by using a valve operated in response to the negative pressure in the intake pipe to protect the exhaust gases cleaning system and to clean the exhaust gases.

6 Claims, 2 Drawing Figures

SECONDARY AIR CONTROLLING APPARATUS FOR INTERNAL COMBUSTION ENGINES

BACKGROUND OF THE INVENTION

1. Field of the Invention

The present invention relates to a secondary air controlling apparatus to be used to clean the exhaust gases of internal combustion engines for vehicles.

2. Description of the Prior Art

As a way of cleaning the exhaust gases of engines for vehicles, there is known an air injection system wherein secondary air is fed into the exhaust passsage to burn and decompose the unburnt harmful component in the exhaust gases. In this cleaning system, if there is a large amount of the unburnt harmful component, when the secondary air is fed with sufficient oxygen, an extreme after-burning will occur. Such after-burning is liable to melt and frequently damage the cleaning system and attachments thereto, such as a catalyst holding member.

Particularly, during deceleration, since the opening angle of the throttle valve of the carburetor is small, less air-fuel mixture is sucked in. Also, the pressure in the intake pipe is lowered, and the liquid fuel on the intake pipe wall is gasified. Therefore, a rich mixture is sucked into the cylinder, and the unburnt harmful component in the exhaust gases increases. This condition results in the after-burning which is undesirable to the cleaning system as described above. Under such conditions, if the secondary air is interrupted, the after-burning can be prevented with the feeding of the rich mixture. Consequently, the unburnt harmful component will be discharged out of the exhaust system without cleaning.

Therefore, during deceleration, it is desirable, on the one hand, to interrupt the feeding of secondary air into the exhaust system to prevent the extreme after-burning and on the other hand, to introduce secondary air into the intake passage to dilute the rich mixture in the intake pipe and improve the combustion within the combustion chamber. The feeding of secondary air into the intake pipe must be made only for an initial period of the deceleration, because if secondary air is continuously provided, the mixture will become too lean. The feeding of secondary air into the exhaust system should be resumed after the initial period. However, this system requires many valves and complicated structure to make the respective operations, and is not adapted for practical use. This problem is solved by the present invention.

Further, when this kind of cleaning system is provided, just after the ignition key is switched off, the engine still rotates for a little while due to its momentum, and the air-fuel mixture sucked into the combustion chamber under such condition is not burnt, but rather is discharged as it is into the exhaust passage. If secondary air is fed into the exhaust passage through a reed valve with a negative pressure part of exhaust pulsation, the unburnt harmful component will combine with sufficient oxygen and explosively burn in the cleaning system remaining at a high temperature, an extreme after-burning will occur, and the exhaust cleaning and exhaust system will be damaged. Therefore, when the engine is turned off, it is also desirable to interrupt the feeding of secondary air into the exhaust passage.

As a way of preventing the after-burning just after the ignition key is switched off, there is a known method wherein, just after the ignition key is turned off, secondary air is introduced downstream of the throttle valve to suppress the rise of the negative suction pressure, to regulate the fuel sucked in from the carburetor, and to prevent the unburnt mixture from being discharged into the exhaust passage. However, in this method, the intake passage always communicates with the atmosphere through the secondary air introducing passage when the engine is off; the liquid fuel on the inner wall of the intake passage evaporates and leaks out to the atmosphere. This is undesirable from the viewpoint of air pollution, and is another problem solved by the present invention.

The present invention solves the above-mentioned various problems in systems for cleaning exhaust gases with secondary air.

SUMMARY OF THE INVENTION

The present invention provides a secondary air controlling apparatus for an internal combustion engine, including: a first chamber communicating with the downstream side of a throttle valve in an intake passage of the engine; a second chamber communicating with the first chamber through a first passage and with the atmosphere; a third chamber communicating with the second chamber through a second passage and with an exhaust passage through a check valve which opens in response to a negative pressure part of a pulsating pressure in the exhaust passage; valve means provided within the second chamber and moved to selectively open and close the first and second passages; means operated by a negative pressure, and arranged between a first negative pressure chamber and a second negative pressure chamber; the valve means being connected with the means operated by negative pressure of the intake passage; the first negative pressure chamber being in communication with the intake passage downstream of the throttle valve; the second negative pressure chamber being connected, in parallel with a main pipe line disposed between the first negative pressure chamber and the intake passage downstream of the throttle valve, through a parallelly-arranged check valve and orifice, and the valve means being moved in response to the difference in negative pressure between the first negative pressure chamber and the second negative pressure chamber.

An object of the invention is to provide a secondary air controlling apparatus wherein, at the time of the engine brake deceleration of a vehicle, a negative pressure in the intake pipe is detected, and the feeding of secondary air into the exhaust pipe is interrupted to prevent after-burning in the cleaning system for the exhaust gases; while secondary air is supplied into the intake passage to dilute the rich mixture, thereby suppressing the emission of unburnt harmful components.

The invention provides a secondary air controlling apparatus including a valve operated by the negative pressure in the intake pipe causing secondary air to enter the suction pipe by the negative pressure fluctuation at the time of the deceleration with engine braking and, at the same time, the feeding of secondary air into the exhaust pipe will be interrupted by the same valve.

Another object is to provide controlling apparatus wherein, because the negative suction pressure is utilized, the detection of the loaded state at the time of deceleration with engine braking is simplified and positively attained by simple structure at minimum cost.

The invention also provides a secondary air controlling apparatus wherein a delay circuit, including a check valve, communicates with means for moving the valve operated by the negative pressure in order to control secondary air only for a predetermined time, thereby positively controlling secondary air for a required interval of time.

A further object is to provide a secondary air controlling apparatus wherein, just after the ignition key is switched off, secondary air is fed into the intake passage to suppress the outflow of the unburnt harmful components into the exhaust passage due to engine momentum, to prevent after-burning, to protect the exhaust system and cleaning device and, at the same time, secondary air is fed into the intake passage only for a certain period to prevent evaporated fuel from leaking out to the atmosphere.

Concretely, the apparatus is provided with: a solenoid valve, opened by turning off the ignition, and arranged between the above-mentioned negative pressure operated valve and the intake passage downstream of the throttle valve, which is a negative pressure source; and a negative pressure reservoir controlling the negative pressure accumulation by means of a check valve and orifice. The valve is opened by the negative pressure in the negative pressure reservoir in response to the switching off of the ignition, to place the intake passage in communication with the atmosphere to supply secondary air. The negative pressure in the reservoir may be gradually reduced by the orifice adjacent to the reservoir and, after the lapse of a certain period, the valve may be closed to seal the intake passage from the atmosphere.

Thus, there is obtained a secondary air controlling apparatus wherein, when the engine stops, secondary air is fed into the intake passage positively and effectively only for a certain period by using, for instance, a delay valve. Moreover, such operation is attained by a simple and reliable structure with minimum cost.

A preferred embodiment of the present invention is explained in detail in the following with reference to the accompanying drawings so that further objects and advantages may be made apparent.

DETAILED DESCRIPTION OF PREFERRED EMBODIMENTS

Figure 1:
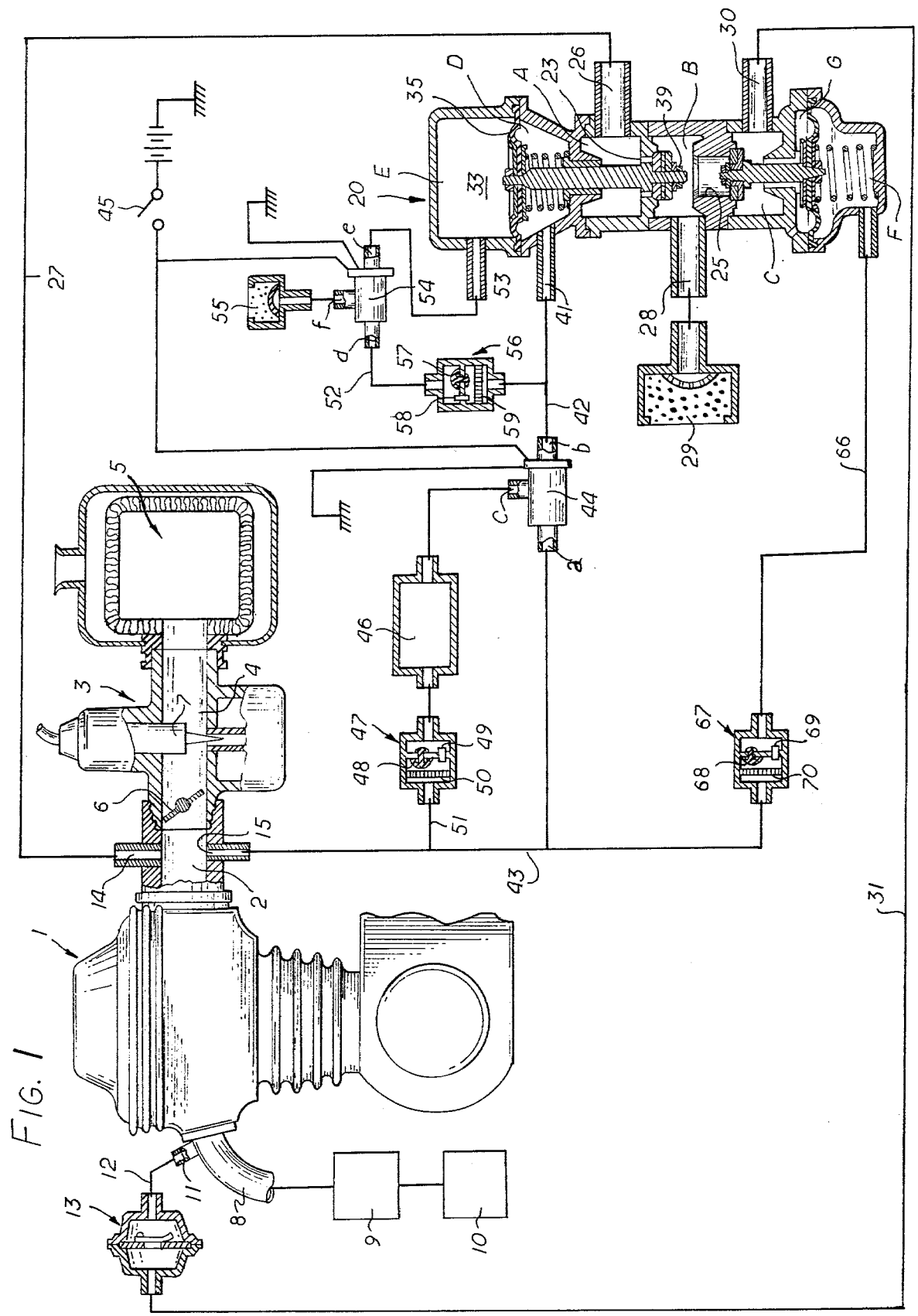
FIG. 1 is a system circuit diagram of the present invention, showing the device partly in section.
Figure 2:
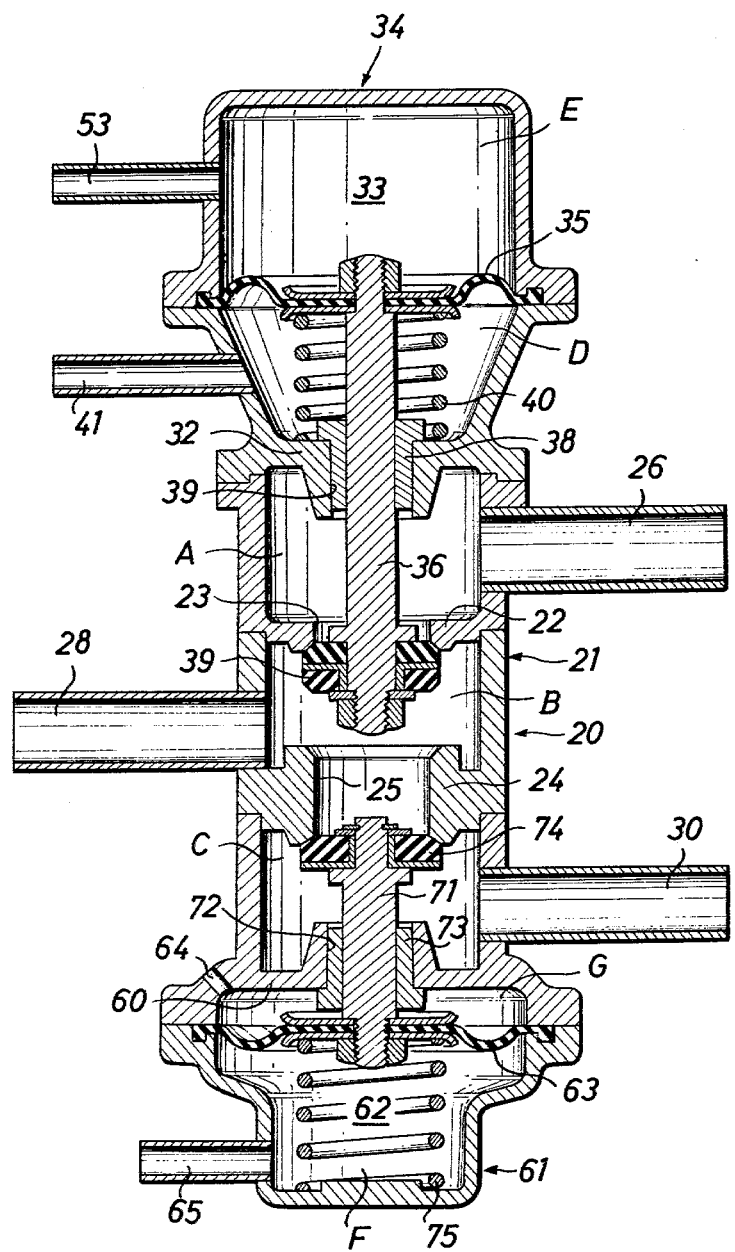
FIG. 2 is an enlarged, vertically-sectioned, view showing a negative pressure operation unit.

FIG. 1 is an explanatory view wherein the illustrated embodiment provides for drawing in secondary air in response to the negative pulsating pressure in the exhaust passage. It may also provide for feeding secondary air by means of an air pump.

An intake port of the combustion chamber of an engine 1 is connected to an intake passage 4 by way of a carburetor 3 and an intake pipe 2. The upstream side of carburetor 3 is connected to an air cleaner 5. A throttle valve 6 is provided downstream of the venturi tube of carburetor 3. A negative pressure piston 7 for controlling the opening of the venturi tube is provided in the venturi tube. The exhaust port of engine 1 is connected to an exhaust pipe 8, which in turn is connected to a muffler 10 through an exhaust gas cleaning device 9, such as a catalytic converter.

A secondary air inlet 11 is provided near the exhaust port of engine 1 in exhaust pipe 8, and is connected to a reed valve 13 through a pipe line 12.

A negative pressure switched valve 20 is operated by the negative suction pressure. A first chamber A, second chamber B, and third chamber C are provided in the longitudinal direction (vertical direction) or vertically in the drawing within a body 21 of valve 20. The chambers are separated by partition walls 22 and 24, provided with passages 23 and 25, respectively, forming valve holes.

Chamber A is provided with an opening 26 connected through a pipe line 27 to a secondary air inlet 14 opening into suction pipe 2. Chamber A is thus in communication with the downstream side of throttle valve 6.

Chamber B is in communication with the atmosphere through an opening 28 and an air filter 29.

Chamber C is provided with an opening 30 which is connected through a pipe line 31 to inlet 11 through valve 13 and pipe line 12.

A negative pressure chamber 33 is formed within a case 34 above a partition wall 32 above chamber A, and is divided into a first negative pressure chamber D and a second negative pressure chamber E by a diaphragm 35 provided in the middle of case 34. A valve stem 36 is secured at its upper end to the center part of diaphragm 35, and vertically passes through a stem guide 38 provided in a hole 37 of wall 32. Stem 36 is provided at its lower end with a valve body 39 normally shielding the lower side of passage 23. A spring 40 is compressed and disposed between the lower surface of diaphragm 35 and wall 32 to resiliently press stem 36 through diaphragm 35 toward the closing position of body 39.

Chamber D is connected through an opening 41 and pipe lines 42 and 43 to a negative pressure outlet 15 provided in pipe 2. A switching valve 44, such as a solenoid valve, is provided on line 42 and makes passages a and b connecting lines 43 and 42 communicate with each other only when an ignition switch 45 is switched on. When switch 45 is switched off, valve 44 interrupts passages a and b from each other, and instead makes passages c and b communicate with each other.

Passage c is connected through a branch pipe line 51 to the negative pressure outlet 15 through a negative pressure reservoir 46 and a delay valve 47 opened by the negative suction pressure. Valve 47 is provided with a sintered metal orifice 49 and an air filter 50, together with an umbrella valve type check valve 48 opening to accumulate the negative pressure in reservoir 46 in case the negative suction pressure is higher than the negative pressure in reservoir 46.

Chamber E is connected through an opening 53 to the downstream side of valve 44 through a branch pipe line 52 in which are provided a switching valve 54, such as a solenoid valve or the like, and a delay valve 56.

Valve 54 is provided with passages d, e and f. Passage f communicates with the atmosphere through an air filter 55. When switch 45 is switched on, passages d and e only communicate with each other to make chamber E communicate with line 42. When switch 45 is switched off, the passages d and e are interrupted from each other, and passages e and f only communicate with each other to make chamber E communicate with the atmosphere. Valve 56 is provided with a sintered metal orifice 58 and an air filter 59 together with an umbrella valve type check valve 57 opened by the negative pressure in chamber E.

Valve 20 is provided with a valve mechanism for feeding secondary air into pipe 8.

A case 61 is provided to form a chamber 62 below a partition wall 60 forming the bottom of chamber C. Chamber 62 is sectioned with a diaphragm 63 to provide a negative pressure chamber F and a chamber G communicating with the atmosphere through an orifice 64. Chamber F is connected through an opening 65 and pipe line 66 to communicate with line 43. A delay valve 67 is disposed in line 66, and provided with a sintered metal orifice 69 and air filter 70 together with an umbrella type check valve 68 opened by the negative suction pressure in pipe 2. Diaphragm 63 is secured to the lower end of a valve stem 71 which vertically passes through a stem guide 73 in a hole 72 of partition wall 60 and through chamber C. Stem 71 is provided at its upper end with a valve body 74 opening and closing passage 25 between chambers B and C. Body 74 is resiliently pressed toward passage 25 through stem 71 by a spring 75 compressed and disposed within chamber F.

The operation is described below. During general running, i.e., the partially loaded running of the vehicle, throttle valve 6 is kept partially open. As a result, high negative pressure to some extent is generated downstream of valve 6, and the negative suction pressure acts on chamber F through outlet 15, and lines 43 and 66. With this negative pressure, diaphragm 63 is lowered against spring 75. Thereby, body 74 is lowered through stem 71 to open passage 25, and chambers B and C communicate with each other. Therefore, inlet 11 communicates with the atmosphere through passage 25 and chamber B. Valve 13 is intermittently opened by the pulsating pressure within pipe 8, and secondary air is led into the exhaust gases from the atmosphere via chamber B, passage 25, chamber C and line 31.

During general running of the vehicle, the negative suction pressure acts also on chambers D and E through outlet 15, line 43, valve 44 and line 42. However, the pressure difference to urge diaphragm 35 against the spring load of spring 40 is not produced between both chambers D and E. Therefore, due to spring 40, body 39 is moved up through stem 36 and closes passage 23 to seal chambers B and A from each other.

When the vehicle decelerates, the opening angle of valve 6 becomes considerably small as shown, and the negative pressure in outlet 15 increases. This negative pressure is transmitted to chamber D via lines 43 and 42. On the other hand, as chamber E is provided with valves 54 and 56 within branch line 52 connecting with line 42, the umbrella valve 57 closes by the negative suction pressure. The negative pressure therefore acts gradually on chamber E through orifice 58 to produce a time lag between the introduction of the negative pressure into chambers D and chamber E. Therefore, chamber D first increases in negative pressure, diaphragm 35 is flexed and lowered against spring 40 so that stem 36 will also be lowered, and body 39 moves apart from the valve seat on the lower surface of passage 23 and is pushed down to make chambers A and B communicate with each other.

By the negative suction pressure during the normal cruising, body 74 is kept lowered to open passage 25 and make chambers B and C communicate with each other. But since body 39 is lowered, as described above, to open passage 23 and make chambers A and B communicate with each other and is further lowered to seat on the upper surface of passage 25 to close it, the communication between chambers B and C is interrupted.

Thus, with the detection of the negative suction pressure at deceleration, the relations of chambers A, B and C at the time of normal cruising is switched over, and chambers B and C are interrupted. With this interruption of chambers B and C, the feeding of air into the secondary air feeding system is also interrupted. At the same time, with communication between chambers B and A, secondary air is fed into pipe 2 through line 27 and inlet 14, and is mixed with the rich mixture produced by the evaporated fuel on the suction pipe wall to dilute the mixture before coming into the combustion chamber at the time of the deceleration, i.e., when valve 6 is closed immediately from the normal running state.

Thus, at deceleration, secondary air is interrupted from being fed into pipe 8 and is fed to the downstream side of the valve 6 to prevent after-burning and to attain optimum combustion in the combustion chamber.

Secondary air is supplied to pipe 2 only in the initial period of deceleration. With the action of valve 56, the negative pressure in chamber E increases gradually. After the lapse of a certain period, the negative pressures in chambers E and D equalizes. With the action of the spring, diaphragm 35 moves up and body 39 closes passage 23 to interrupt again communication between chambers A and B, to interrupt the feeding of secondary air into the suction passage, and to prevent the dilution of the mixture over a long period during deceleration.

The operation at the time of stopping the engine is described below.

When switch 45 is switched off to stop the engine, valve 44 is switched over to make passages c and b communicate with each other. The negative pressure accumulated within negative pressure reservoir 46 is led into chamber D through passages c and b and the downstream side of line 42, and immediately moves diaphragm 35 down to depress body 39 and open passage 23. Chambers A and B communicate with each other to allow secondary air flow into pipe 2 through line 27 and inlet 14 so that this part reaches atmospheric pressure. The fuel sucked into the combustion chamber is thus diluted by the momentum of the engine. The mixture discharged into the exhaust passages becomes lean. After-burning is thus prevented.

When body 39 moves down, passage 25 is closed, and chambers B and C are interrupted from each other to stop the feeding of secondary air into the exhaust passage. Therefore, the after-burning prevention is further improved.

If this condition is continued, the evaporated fuel on the suction passage wall leaks out into the atmosphere. However, the invention operates as follows to prevent this.

As valve 47 is provided with orifice 48 in parallel with valve 48, the atmospheric pressure led into outlet 15 is in turn introduced into chamber 46 through orifice 49. The negative pressure in chamber D is thus gradually reduced. Diaphragm 35 moves up due to the action of the spring. Body 39 moves up to close passage 23 and chambers A and B are interrupted from each other. In other words, when the ignition key is switched off, valve 20 is switched by the accumulated negative pressure to feed secondary air into the intake passage, but this secondary air feeding system operates only for a certain period and the suction passage is interrupted from the atmosphere after the lapse of a certain period. Even if the intake passage communicates with the atmosphere when the ignition key is switched off, this sytem is closed so that the evaporated fuel cannot leak out into the atmosphere.

When switch 45 is switched off, valve 54 makes a switching operation to make passages f and e communicate with each other. Atmospheric pressure is then introduced into chamber E so that diaphragm 35 will be quickly moved down by the introduction of negative pressure into chamber D, and secondary air will be quickly introduced into the intake passage. Thus, when the engine stops, the above described effect can be attained reliably.

If desired, an air pump can be used to feed secondary air into the exhaust pipe.

Also, the negative pressure operation is made with the diaphragm in the illustrated embodiment, but a piston may alternatively be used.

In the illustrated embodiment, the negative valve 20 is used also to interrupt secondary air from the exhaust passage and to put secondary air into the intake passage when the engine stops. However, such structure is not necessarily required. Alternatively, the valve may be driven by the negative pressure in the negative pressure reservoir, as operatively connected with the switching off of the ignition switch, to establish a feeding system of secondary air into the suction passage and, after the lapse of a certain period, the system may be interrupted.

I claim:

1. A secondary air controlling apparatus for an internal combustion engine, comprising:
    a first chamber communicating with the downstream side of a throttle valve in an intake passage of said internal combustion engine;
    a second chamber communicating with said first chamber through a first passage and with the atmosphere;
    a third chamber communicating with said second chamber through a second passage and with an exhaust passage through a one-way valve which opens in response to a negative pressure part of a pulsating pressure in said exhaust passage;
    valve means provided within said second chamber and moved to selectively open and close said first and second passages;
    means operated by a negative pressure, and arranged between a first negative pressure chamber and a second negative pressure chamber;
    said valve means being connected with said means operated by negative pressure;
    said first negative pressure chamber being in communication with said intake passage downstream of said throttle valve;
    said second negative pressure chamber being connected, in parallel with a main pipe line disposed between said first negative pressure chamber and said intake passage downstream of said throttle valve, through a parallelly-arranged first check valve and a first orifice; and
    said valve means being moved in response to the difference in negative pressure between said first negative pressure chamber and said second negative pressure chamber.

2. An apparatus according to claim 1, wherein:
    said second passage is closed while said first passage is opened by negative pressure in said first negative pressure chamber which is greater than the pressure in said second negative pressure chamber; and
    said second passage is opened when negative pressure in said second negative pressure chamber becomes substantially equal to the pressure in said first negative pressure chamber.

3. An apparatus according to claim 1, wherein:
    said means operated by the negative pressure is a diaphragm.

4. An apparatus according to claim 1, wherein:
    valve means, opening and closing the second passage between the second chamber and the third chamber communicating with said exhaust passage through said check valve, is provided to be moved by said means operated by the negative pressure in said intake passage downstream of said throttle valve;
    said means operated by the negative pressure is operatively connected with a second check valve and a second orifice; and
    said second check valve being opened by said negative pressure.

5. An apparatus according to claim 1, wherein:
    a first switching valve is provided in said main pipe line;
    a branch pipe line is provided in said main pipe line between said first switching valve and said intake passage to be connected with said switching valve;
    a third check valve, opened by negative suction pressure, and a third orifice are provided in parallel with each other in said branch pipe line; and
    a reservoir for negative pressure from said intake passage is provided in said branch pipe line between said third check valve and orifice and said first switching valve so that when the ignition switch is switched off, said first negative pressure chamber may communicate with said branch pipe line through said first switching valve.

6. An apparatus according to claims 1 or 5, wherein:
    a second switching valve is provided in a pipe line connecting said second negative chamber with said main line of said first negative pressure chamber through said first check valve and orifice provided in parallel with each other, so that when the ignition switch is switched off, the atmosphere may be introduced into said second negative pressure chamber.

* * * * *